United States Patent
Sun et al.

(10) Patent No.: US 9,148,460 B1
(45) Date of Patent: Sep. 29, 2015

(54) PUSH NOTIFICATIONS FOR ENTERPRISE APPLICATIONS

(71) Applicant: CELLCO PARTNERSHIP, Basking Ridge, NJ (US)

(72) Inventors: Ying Sun, Easton, PA (US); Sankar Shanmugam, Dayton, NJ (US); Venkateswara R. Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 480 days.

(21) Appl. No.: 13/731,416

(22) Filed: Dec. 31, 2012

(51) Int. Cl.
  *G06F 15/16* (2006.01)
  *H04L 29/06* (2006.01)
(52) U.S. Cl.
  CPC .................... *H04L 65/4061* (2013.01)
(58) Field of Classification Search
  CPC ................................................ H04L 65/4061
  USPC ........................................................ 709/227
  See application file for complete search history.

(56) References Cited

U.S. PATENT DOCUMENTS

2011/0283347 A1* 11/2011 Bhuta et al. ................. 726/9
2013/0084896 A1* 4/2013 Barkie et al. .............. 455/466
2014/0007213 A1* 1/2014 Sanin et al. .................. 726/9

* cited by examiner

*Primary Examiner* — Bryan Lee

(57) ABSTRACT

An enterprise push application on a mobile device receives a registration credential for registering an enterprise application with an enterprise push server operated by a first enterprise. The enterprise push application forwards the registration credential from the enterprise push application to the enterprise push server for registering the enterprise application with the enterprise push server. An indication of successful registration of the enterprise application is received at the enterprise push application and from enterprise push server. Responsive to the indication of a successful registration, a first persistent connection between the enterprise push application and the enterprise push server to receive enterprise data from the enterprise push server and at the enterprise push application is established. The first persistent connection is in addition to or instead of a second persistent connection established by a second enterprise different from the first enterprise for routing enterprise data to the mobile device.

21 Claims, 12 Drawing Sheets

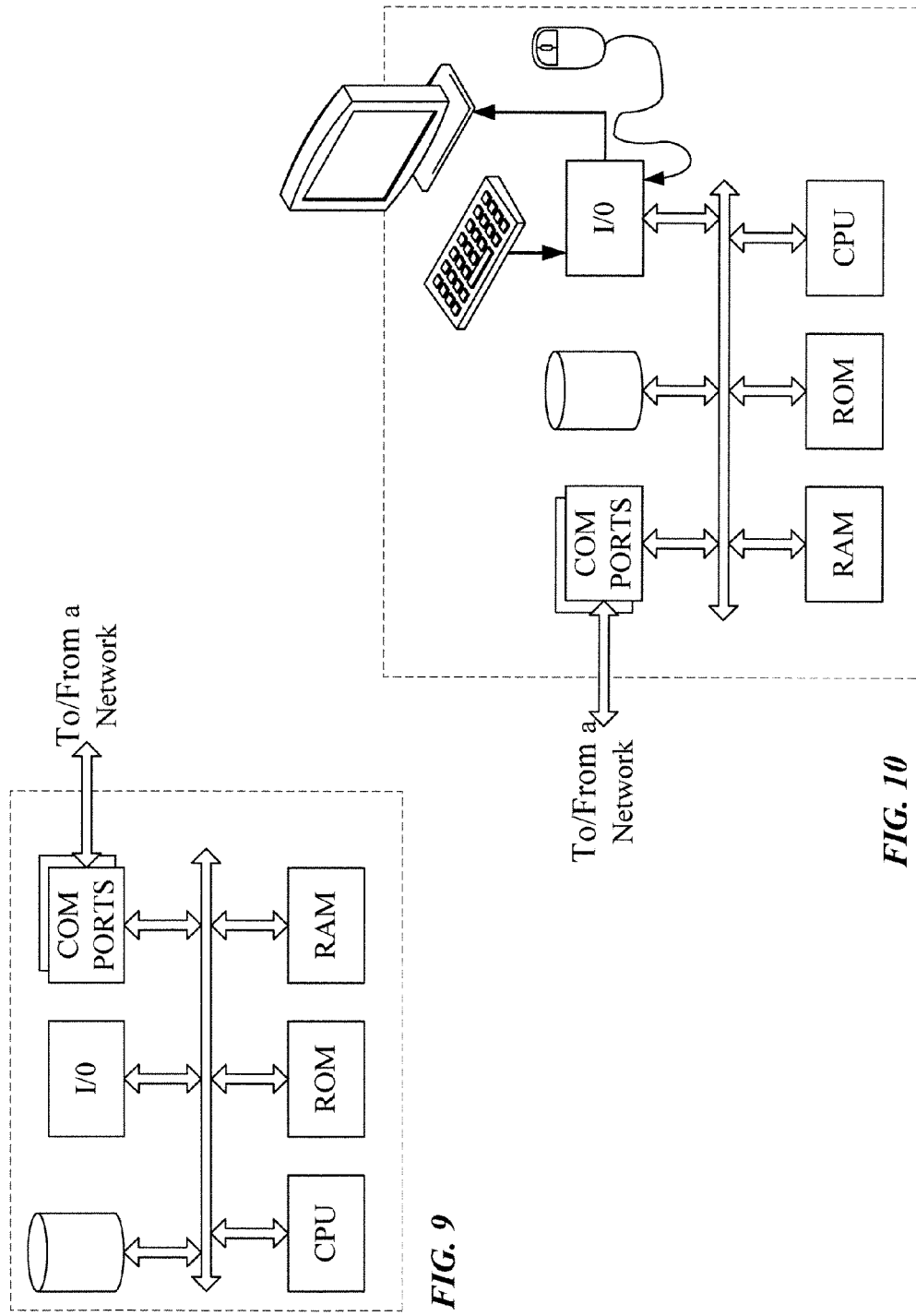

PUSH NOTIFICATIONS FOR ENTERPRISE APPLICATIONS

BACKGROUND

Push Technology is a client-server model that allows a server to send data to a client when new data is available. The basic idea behind Push Technology is to hold a persistent connection between the client and the server at all times. Push Technology is contrasted with Pull Technology, where the client has to set up a new connection to the server to request the new data. There may be two main benefits for Push Technology as compared to Pull Technology. First, Push Technology is faster. The persistent connection in Push Technology ensures that the data delivery from the server to the client is near real-time. Applications like weather alerts, stock stickers, emails, etc. can benefit from this low-latency delivery. Second, Push Technology is more efficient since the client accepts data when there is some new data on the server.

Mobile devices have been playing a more and more important role in everyone's life. People are using mobile devices for browsing websites, receiving messages, reading emails and many other kinds of activities. Mobile applications can benefit a lot from Push Technology. It can deliver near-real-time emails to your devices and sync your contacts, calendar and task data when you update them from somewhere else. In general, Push Technology is more efficient than Pull Technology. This is a big advantage for mobile devices because it can save a lot of bandwidth and extend battery life. Popular mobile platforms provide Push Technology on the mobile devices. On the Android platform, Cloud to Device Messaging (C2DM) is available. On the iOS platform, Apple Push Notifications Service (APNS) is available. Both C2DM and APNS utilize Push Technology to send data from servers to their applications on the devices.

In recent years, the number of applications running on mobile devices has grown rapidly. More and more large companies and organizations support critical business functions and use of business applications via mobile devices. This kind of applications is known as Enterprise Mobile Applications. Via Enterprise Mobile Applications, employees can do several enterprise tasks. For example, employees can provide customer-relationship management (CRM), conduct enterprise resource planning (ERP), access company emails, address books and calendars, manage purchase orders and fill out sales invoices, receipts, etc.

Many mobile applications have been developed and used by organizations around the world on various mobile platforms. The iOS platform on iPhone, iPad and iPod Touch may be among the most popular ones for its highly polished, elegant-looking applications. On the iOS platform, Apple Push Notifications Service (APNS) is available as Push Technology. APNS is a service provided by Apple Inc. on its iOS platform. It uses Push Technology to send notifications from the server to the iOS device through a persistent connection. There may be several limitations associated with APNS for Enterprise Applications. First, APNS may require that all the enterprise data be routed to APNS to be delivered to the devices. This is a security concern to some enterprise companies, which are not willing to route data through Apple servers. Even though the data can be encrypted, information like targeted devices, number of messages, message frequency, delivery time, etc. is exposed to Apple Inc. Second, APNS may require each application to go through the iOS Developer Program provisioning procedures to be eligible to utilize APNS. Third, APNS may impose a maximum size limit (e.g., 256 bytes) on notification payloads. Finally, APNS may not guarantee delivery and may retain only the last notification if the device is offline. As such, data may be lost when utilizing APNS.

Hence, a need exists for delivering enterprise data from the Enterprise to the mobile device without having to go through APNS or similar services not under the control of the enterprise.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 9 illustrates a network or host computer platform, as may typically be used to implement a server; and FIG. 10 depicts a computer with user interface elements, as may be used to implement a personal computer or other type of workstation or terminal device.

DETAILED DESCRIPTION

Figure 1:
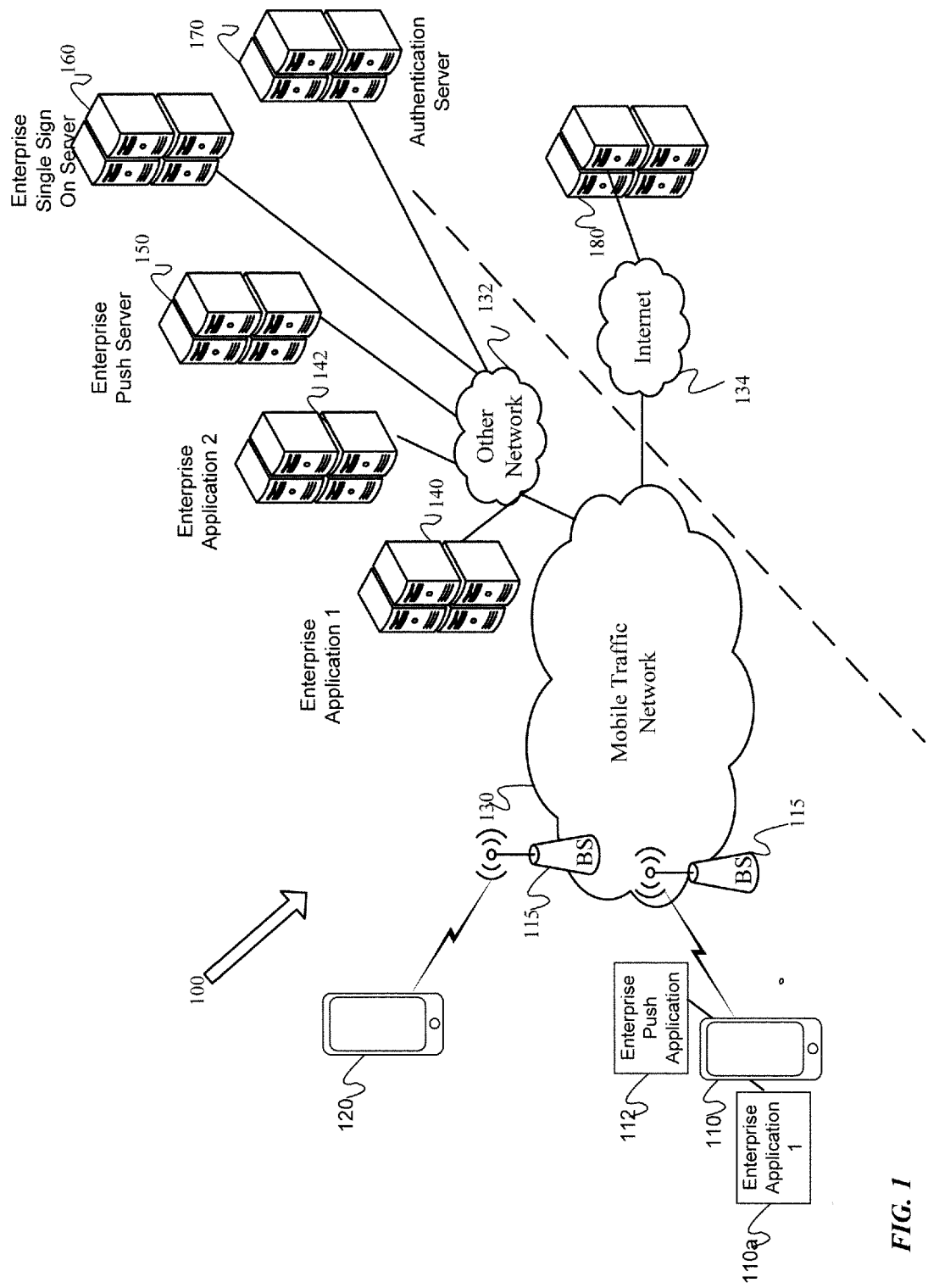
FIG. 1 illustrates an exemplary enterprise network environment providing an enterprise push notification service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

The instant application describes an enterprise push notification system that includes a push application and a push server. The push application may be stored on a mobile device, and the push server may be maintained in the mobile communication network. The push application may be configured to establish a persistent connection with the push server and may be used to route enterprise data between enterprise applications on the mobile device and the push server. The persistent connection between the push application and the push server may be in addition or instead of the connection between the mobile device and the APNS. Since the end-to-end design of the enterprise push notification system may not be related to the iOS platform's APNS, the enterprise data are transmitted through this connection, and associated information such as, for example, amount, frequency, and delivery time may be hidden from APNS.

The persistent connection in the enterprise push notification system may be under the control of the enterprise push notification system. The enterprise push notification system may be enterprise-specific. In this context, the term "enterprise" may refer to a unit of economic organization, such as a business organization, a company, or a firm. For example, Verizon Wireless™ may have one enterprise push notification system and AT&T™ may have another enterprise push notification system. To this end, a mobile device that includes Verizon Wireless™ enterprise applications may utilize the Verizon Wireless™ enterprise push application system to send enterprise data to Verizon Wireless™ and to receive enterprise data from Verizon Wireless™. A mobile device that includes AT&T™ enterprise applications may utilize AT&T™ enterprise push application system to send enterprise data to AT&T™ and receive enterprise data from AT&T™. Along these lines, a mobile device that includes both Verizon Wireless™ and AT&T™ applications may utilize both Verizon Wireless™ and AT&T™ enterprise push notification systems, each for its respective enterprise data.

As a result, the enterprise push notification system of the instant application can be configured to apply the specific enterprise encryption mechanisms for sensitive data communicated between them. Thus, data delivery based on the enterprise push notification system of the instant application may be more secure, and companies may more easily control the level of security. Furthermore, the enterprise push notification system of the instant application may be configured to set the proper maximum size of payload based on type of data traffic between the enterprise and the specific enterprise application, instead of a fixed size imposed by the APNS. The enterprise push notification system also may eliminate the need for each enterprise application to be provisioned for APNS through the iOS Developer Program, since an enterprise application registers through the push application to receive push notifications from the push server. Thus, registration policy can be controlled and customized according to the design of the application. Furthermore, the enterprise push notification system of the instant application may be configured to acknowledge the notification. To this end, if the push server does not receive acknowledgement from the device, the push server can store the notification in the database and deliver it to the push application later.

With this general overview, reference now is made in detail to the examples illustrated in the accompanying drawings and discussed below. An exemplary enterprise network environment 100 is described initially with respect to FIG. 1. By way of illustration, the enterprise in our example operates a mobile communication network and offers its users and potential users (i.e., customers) communication services, as well as other services marketed and/or provided through the network. For example, the communication network 130 may be implemented as a network conforming to one or more well known wireless networking standards and protocols. Examples of such standards include, but are not limited to, the Code Division Multiple Access (CDMA) IS-95 standard, the 3rd Generation Partnership Project (3GPP) wireless IP network standard, the 3rd Generation Partnership Project 2 (3GPP2) wireless IP network standard, the Evolution Data Optimized (EVDO) standard, the Global System for Mobile (GSM) communication standard, the Time Division Multiple Access (TDMA) standard, or other standards used for public mobile wireless communications.

In the example illustrated in FIG. 1, the enterprise environment 100 includes a client device 110 and a client device 120, which communicate request messages to one or more servers 140, 142, 150, 160, and 170 through a communications network 130, which can include, for example, one or more interconnected networks such as a network 132 and the Internet 134. In the example, servers 140 and 142 are associated with different enterprise applications. For example, servers 140 and 142 each correspond to an enterprise application provided by the enterprise providing the mobile communication network 130 (e.g., Verizon Wireless™). The servers 140 and 142 may be in communication with enterprise applications on the client devices 110 and 120 through the enterprise push server 150 and an enterprise push application on the client devices 110 and 120.

Figure 2:
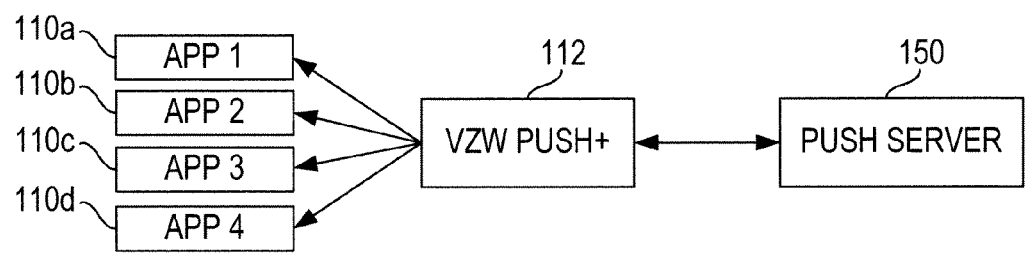
FIG. 2 illustrates enterprise applications on a mobile device receiving push notifications from an enterprise push server shown in FIG. 1.

As will be described in further detail below, the push server 150 may receive notifications from the enterprise applications 140 and 142 and may push the notifications to the enterprise push application 112 on the client device 110 for delivery to the enterprise application 110a also stored on the device. The client device 110 may have several enterprise applications that the client device's 110 user (e.g., the enterprise employee) accesses on a daily basis and which are configured to received push notifications from the push server 150 through the push application 112. Referring to FIG. 2, for example, the client device 110 may include enterprise applications 110a-110d, which may be configured to receive push notifications from the enterprise push server 150 through the enterprise push application 112.

Each of these applications 110a-110d may have its own login screen and secure channel through which it authenticates the user and the device. User authentication may ensure that the device belongs to a valid account and that the account is authorized for data connectivity with the enterprise. Once user authentication is completed, device authentication may be performed. This process starts with determining the correct mobile telephone number (MTN) of the client device 110 so as to be able to retrieve the device specific information from the carrier network database and to send it for further processing.

Figure 3:
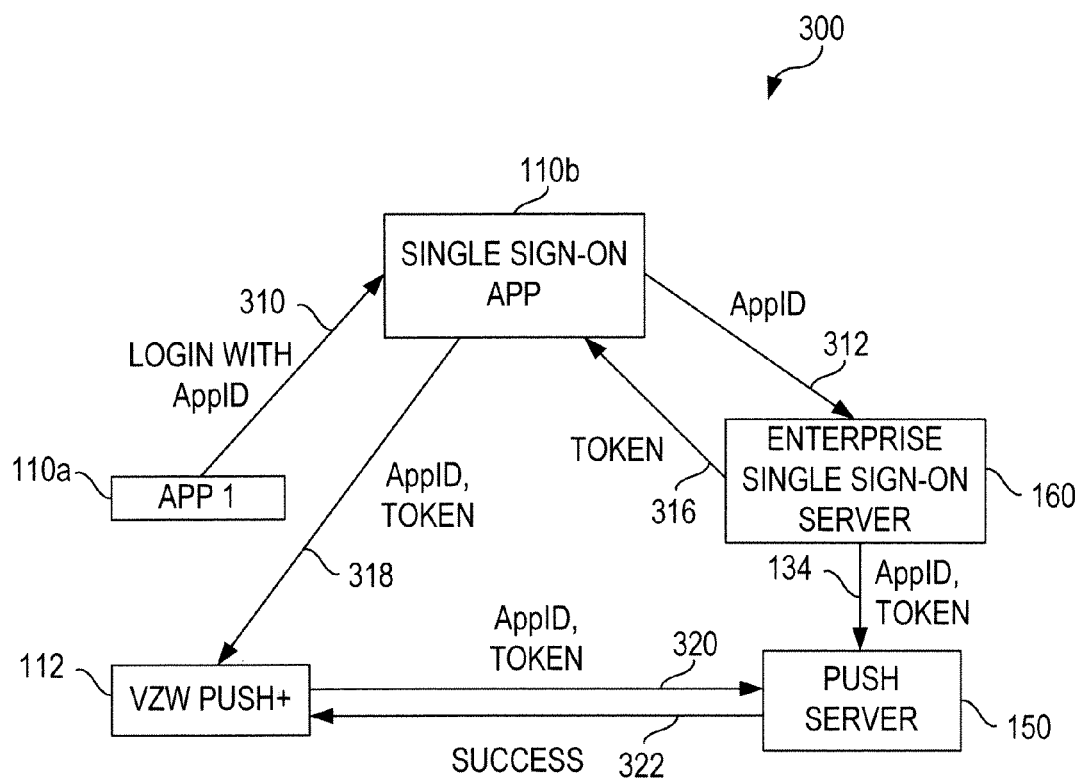
FIG. 3 illustrates an exemplary process for authenticating an enterprise application and registering the enterprise application for the enterprise push notification service.

FIG. 3 illustrates an exemplary process 300 for authenticating the enterprise application 110a and registering the enterprising application 110a for the enterprise push notification service. When a user (e.g., the employee) accesses the enterprise application 110a on the client device 110, the enterprise application 110a may activate the Single Sign On (SSO) application 110b, also stored on the client device 110, to prompt the user for login credentials. The SSO application 110c may allow authentication of the device 110 so the employee can seamlessly access the enterprise applications without the need to log in the credentials each time when a different enterprise applications is accessed. The login credentials may include the application's 110a ID and password and may be provided to the SSO application 110b by the user and/or by the application 110a (Step 310). The SSO application 110c may encrypt the login credentials, and may send the login credentials for authentication to the enterprise SSO server 160 using HTTPs protocol (Step 312). After the SSO server 160 receives the request, it authenticates the user by performing various checks. The various checks may include querying the network authentication server 170 to confirm that the login credentials received from the device 110 are valid. Upon confirming that the login credentials are valid, the SSO server 160 generates a token and passes the token with the application ID to the enterprise push server 150 for purposes of registering the enterprise application 110*a* with the enterprise push server 150, as described in more detail below (Step 134). The SSO server 160 also provides the SSO application 110*b* with the token (Step 316). Once the SSO application 110*b* receives the token, it may encrypt the token and store it locally on the client device 110. The SSO application 110*b* also provides the application ID along with the token to the enterprise push application 112 (Step 318).

The enterprise push application 112 provides the application ID and the token to the enterprise push server 150 for registering the enterprise application 110*a* with the enterprise push server 150 (Step 320). The enterprise push server 150 checks the token provided by the enterprise push application 112 against the token provided by the SSO server 160, and if they match, the enterprise push server 150 registers the enterprise application 110*a* and sends a registration success message to the enterprise push application 112 on the client device 110 (Step 322). If the token provided by the enterprise push application 112 does not match the token provided by the SSO server 160, the enterprise push server 150 does not register the enterprise application 110*a* and sends a registration failure message to the enterprise push application 112. After registration, the enterprise application 110*a* is ready to receive the push notifications sent from the enterprise push server 150. Other enterprise applications on the client device 110 may go through the same registration process as the enterprise application 110*a*.

Once registered, the token may expire after a certain time period (e.g., 5 minutes) on the server side. Once the persistent connection between the enterprise push application 110*a* and the enterprise push server 150 is established, a Session ID is returned to the enterprise push application 112. The enterprise push application 112 can re-use the Session ID to establish connection with the enterprise push server 150 if disconnected. The Session ID may expire after a certain time period (e.g., 7 days). After the certain time period expires, the connection can be re-established by an application registration and a new Session ID may be returned. If the client device 110 is rebooted, the Session ID may be lost. In this scenario, the connection can be re-established by an application registration. In previous two scenarios, the need of application registration may only be for re-establishing the persistent connection. The applications (if already registered) still remain registered and are able to receive push notifications as long as the enterprise push application 112 is connected to enterprise push server 150.

Communication network 130 of enterprise environment 100 facilitates communications between various types of clients and servers for purposes of client access to the functionality of an enterprise push notification service hosted at the enterprise push server 150. Network 130 can be any network or combination of networks in an overall communication network for transmitting voice and other types of data communications between various devices associated with the communication network. Network 130 can include, but is not limited to, a wired (e.g., Ethernet) or a wireless (e.g., Wi-Fi or 4G) network. In addition, network 130 can include a local area network, medium area network, and/or wide area network. Network 130 can support protocols and technology including, but not limited to, Internet or World Wide Web protocols and communication services. Intermediate network routers, gateways, or servers may be provided between components of enterprise environment 100 as may be necessary, depending upon a particular network implementation or computing environment.

In an example, communications network 130 allows users of client devices 110 and 120 (and other devices not shown) to initiate and receive telephone calls to each other. Additionally, network 130 enables users to request various data services via the Internet 134, such as downloads, web browsing, email, and other similar types of web services. Such data services are hosted on one or more application servers associated with network 130. As communications network 130 of enterprise environment 100 can be implemented using a number of interconnected networks, the overall network for the enterprise environment may include a number of radio access networks (RANs). Such radio access networks can also include a traffic network for transferring user communications and data; e.g., from client device 110 to base station 115 and other elements with or through which client device 110 communicates. The network can also include elements that support functionality other than device-to-device media transfer services, such as messaging service messages and voice communications. Specific elements of communications network 130 for carrying voice and data traffic and for controlling various aspects of the calls or sessions are omitted here for simplicity.

The client devices 110 and 120 are examples of two types of client devices that may be used for receiving enterprise notifications from the enterprise push server. In the example shown in FIG. 1, client device 110 is a mobile station or device for accessing mobile wireless communications services through communications network 130; for example, via one or more base stations (BSs) 115. Thus, client device 110 can be any type of mobile computing device capable of sending and receiving voice and data communications over one or more networks. Examples of such mobile computing devices include, but are not limited to, portable handsets, smartphones, tablet computers, and personal digital assistants. Similarly, client device 120 can be any type of general-purpose computing device, such as a desktop personal computer.

While the example in FIG. 1 shows only two client devices 110 and 120, enterprise environment 100 can be used to facilitate data communications for additional devices (not shown) over communications network 130. Similarly, enterprise environment 100 can include other servers in addition to servers 150 and 160 for receiving support-related issues from the client devices 110 and 120. Furthermore, the present techniques may be implemented in communications network 130 using any of a variety of available communications networks and/or on any type of computing device compatible with such a network. As such, FIG. 1 is used herein to provide only a very simplified example of a few relevant elements of enterprise environment 100 and network 130, for purposes of discussion and ease of explanation.

The enterprise push application 112 may categorize the message received from the enterprise push server 150 into several types. In one example, the categorization may be based on the ID of the application toward which the message or notification is targeted. The enterprise push application 112 may categorize the message received from the enterprise push server 150 into two categories: (1) the enterprise push application message and (2) the application-directed message. The enterprise push application message is for the enterprise push application 112 and includes the enterprise push application's 112 ID. For the enterprise push application message, the enterprise push application 112 can parse the message content and take appropriate actions. The application-directed message is for other applications which have their own business logics to parse and process the messages. The other applications include the applications which have been registered with the enterprise push server 150 through the enterprise push application 112.

In one implementation, when the enterprise push application 112 receives the message, the enterprise push application 112 extracts the application ID information from the message to identify the message type. If the application ID matches the application ID of the enterprise push application 112, the message may be considered to be an enterprise push application message. Otherwise, the message may be considered to be an application-directed message. The enterprise push application 112 may store the application ID of the various applications that register through it for the enterprise notification service. To this end, if the message includes an application ID that matches one of the applications IDs stored in the enterprise push application 112, the enterprise push application 112 delivers the message to the application matching the application ID in the message. The following sections describe how the enterprise push application 112 delivers the two types of push messages to the applications. First, the delivery of the enterprise push application message is described with respect to FIGS. 4A-4B and 5A-5B. Second, the delivery of the application-directed message is described with respect to FIGS. 6 and 7A-7B.

Figure 4A:
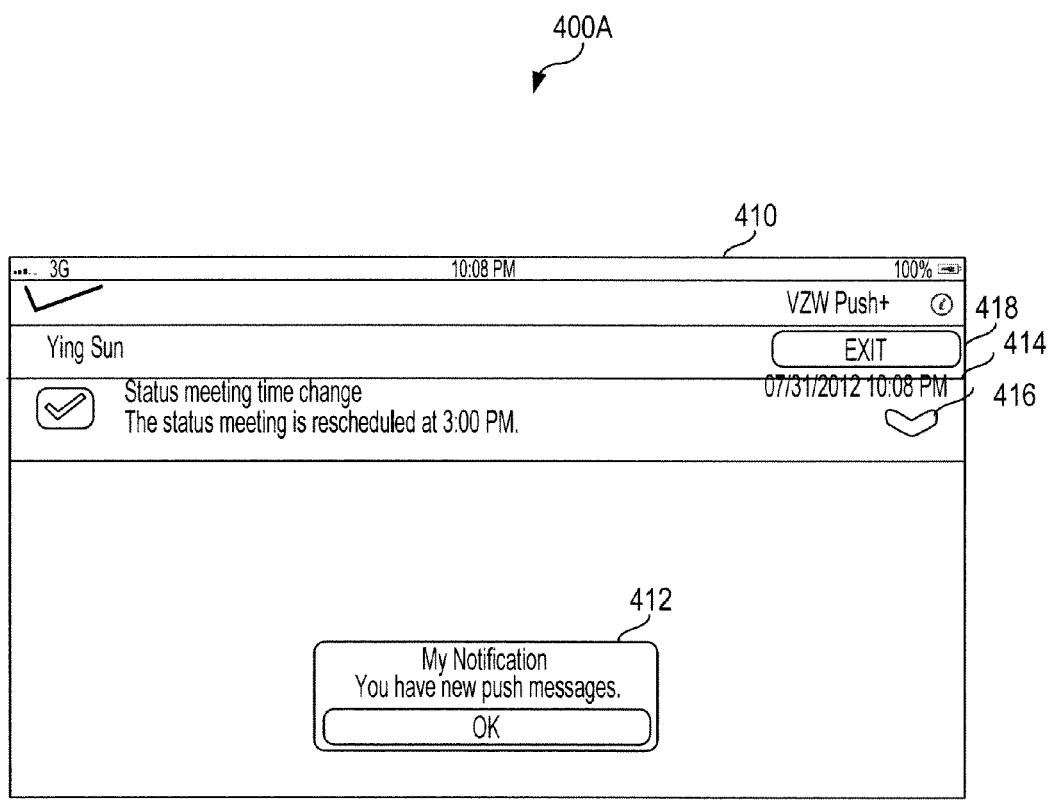
FIG. 4A illustrates an exemplary user interface showing an enterprise push application running in the foreground of a mobile device receiving an enterprise push application message from the enterprise push server shown in FIG. 1.

FIG. 4A illustrates an exemplary user interface 400A showing the enterprise push application 112 running in the foreground of the mobile device 110 receiving an enterprise push application message from the enterprise push server 150. When the enterprise push application 112 is running in the foreground of the mobile device 110, an inbox 410 may be displayed on the mobile device 110. The inbox may show the messages received from the enterprise push server 150. The messages in the inbox 410 may be stacked in the order in which they were received. For example, the first received message may be displayed at the bottom of the stack in the inbox 410 and the latest received message may be displayed at the top of the stack in the inbox 410.

When a new message is received, the inbox 410 may show a notification in the form of, for example, a popup 412 to notify the user that there is a new push message waiting to be viewed by the user. The inbox 410 may also display a banner 414 associated with the message. The banner 414 may display the title associated with the message, along with the time and date the message was received by enterprise push application 112. The user may select the message by clicking on the title of the message or other locations within the banner 414. Upon selecting the message, the inbox 410 displays another user interface that allows the user to read the content of the message. Alternatively or additionally, the user may be able to click on the arrow icon 416 to expand the message and later contract the message using the same arrow icon 416. If the user wishes to exit the inbox 410, the user may select the exit icon 418.

Figure 4B:
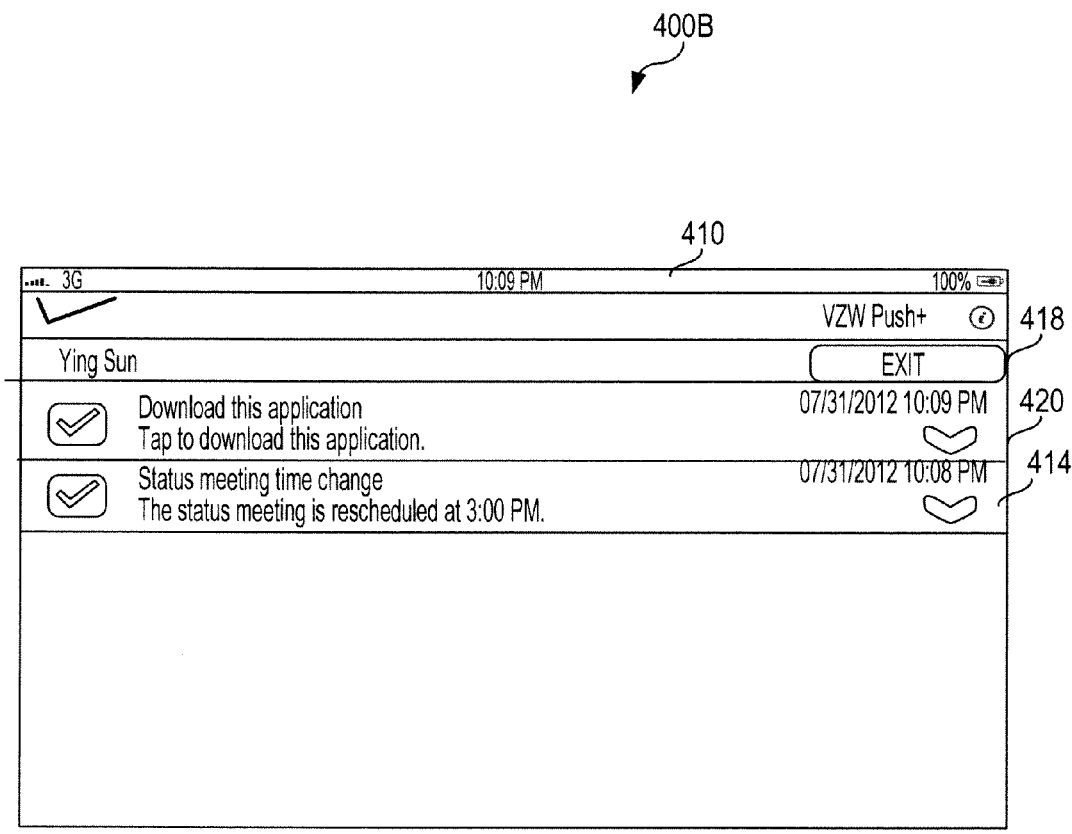
FIG. 4B illustrates an exemplary user interface showing an enterprise push application running in the foreground of a mobile device receiving another enterprise push application message from the enterprise push server shown in FIG. 1.

FIG. 4B illustrates an exemplary user interface 400B showing the enterprise push application 112 running in the foreground of the mobile device 110 receiving another enterprise push application message from the enterprise push server 150. As shown, as the time passes, additional messages may be received by the enterprise push application 112 and may be displayed to the user in the inbox 410. In this example, the additional message is for downloading a specific application. When the user clicks on the message 420, the enterprise push application 112 may begin the application download process. When the user clicks on the message 414, the enterprise push application 112 may display information to the user that a specific meeting has been rescheduled. To this end, the enterprise push application 112 may be able to parse the enterprise push application message and determine the specific actions that should be taken and the specific information that should be displayed.

Figure 5A:
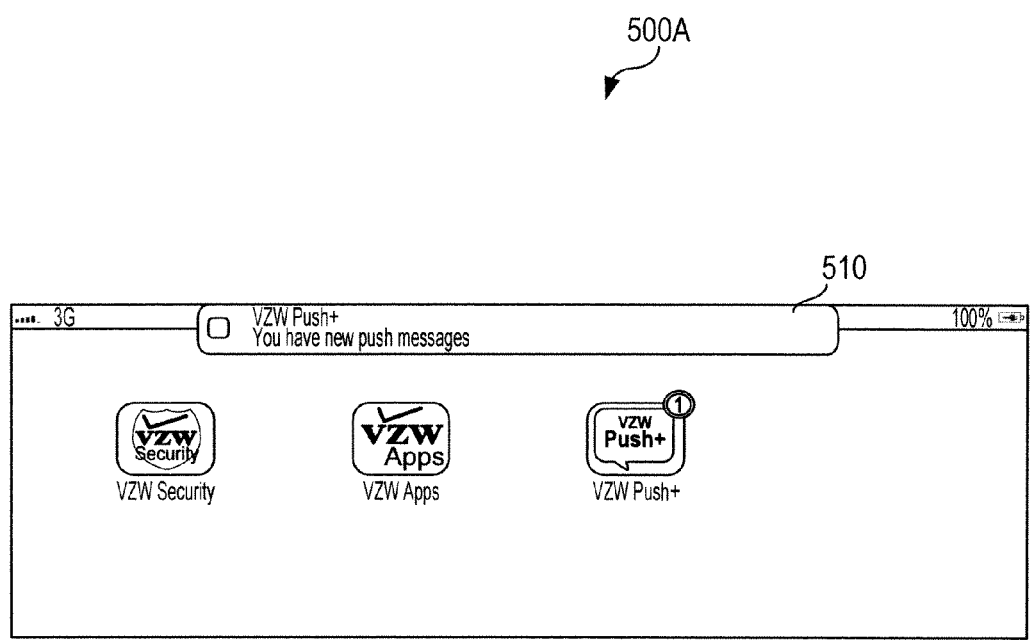
FIGS. 5A-5B illustrate an exemplary user interface showing an enterprise push application running in the background of the mobile device receiving an enterprise push application message from the enterprise push server shown in FIG. 1.
Figure 5B:
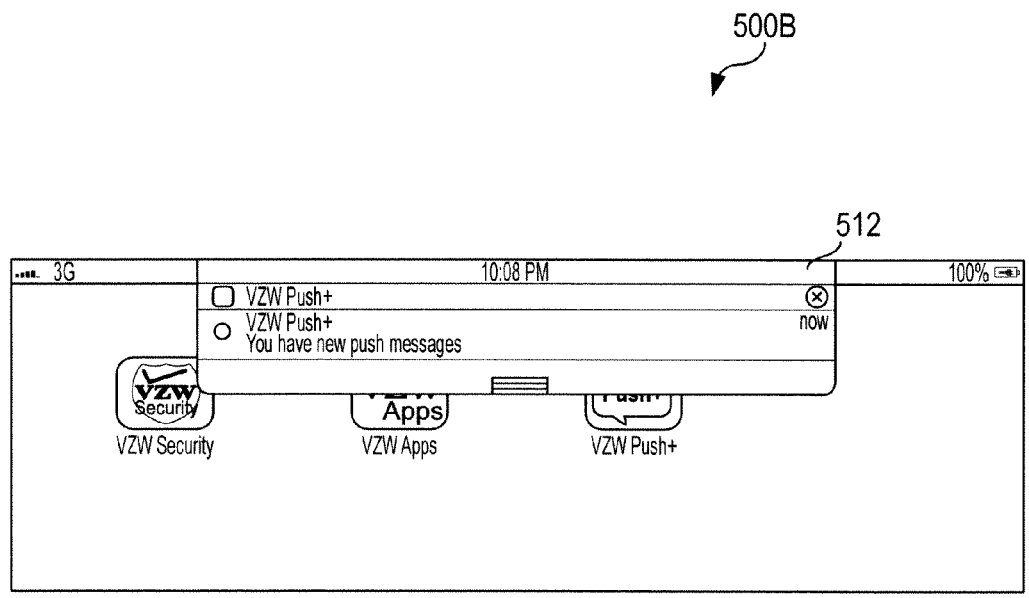

FIG. 5A illustrates an exemplary user interface 500A showing the enterprise push application 112 running in the background of the mobile device 110 receiving an enterprise push application message from the enterprise push application 150. When the enterprise push application 112 is running in the background of the client device 110, the enterprise push application 112 may send an iOS local notification to notify the user that he/she has a new push message. The notification, may be shown in the form of a banner 510 on top of the screen or on some other location of the client device 110. The banner 510 may appear for several seconds and disappear thereafter. If the banner 510 disappears, it can be later viewed in the iOS notification center. In one example, the iOS notification center 512 may be accessed by swiping the top of the screen, as shown by an exemplary user interface 500B of FIG. 5B. If the user selects the banner 510 or the notification 512 in the iOS notification center, the user may launch the enterprise push application 112, which will show the message displayed in the inbox 410. Of course, the user may directly access the enterprise push application 112 by clicking on its application icon shown on the screen of the client device 110. The enterprise push application icon may show to user that a new message has arrived. For example, referring again to FIG. 5A, the application icon 514 may show a color-coded number in the corner of the icon 514 indicating the number of new messages waiting to be viewed by the user.

Figure 6:
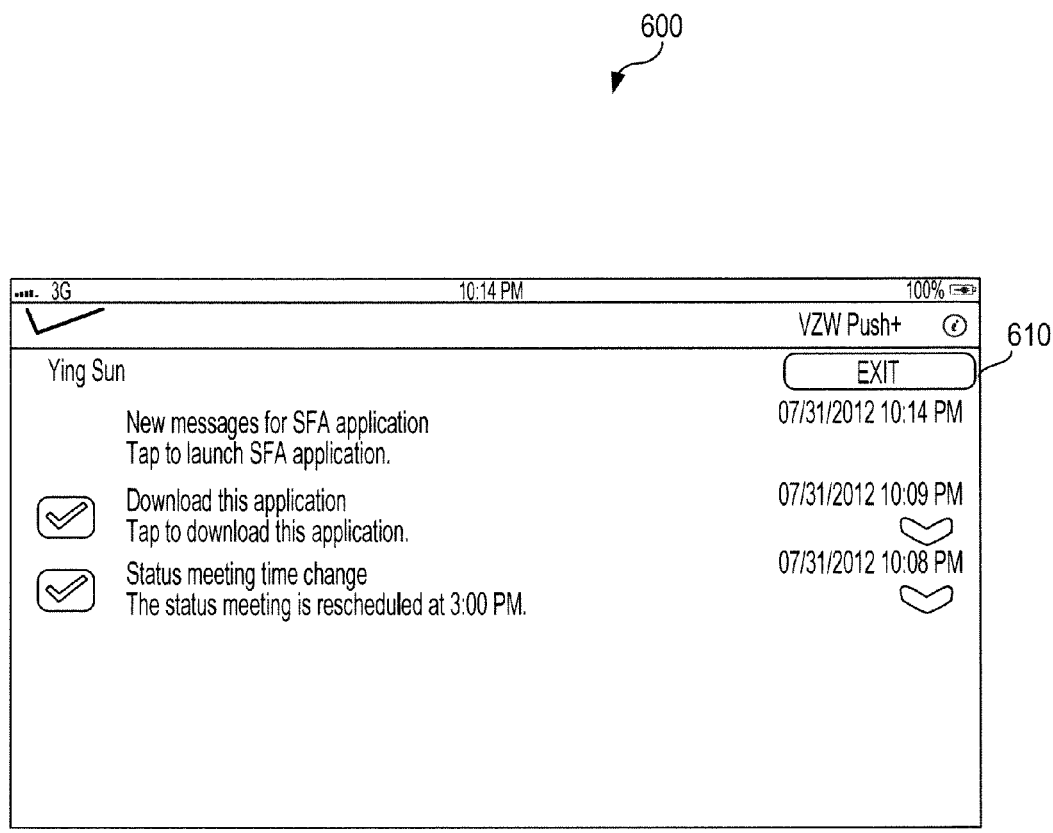
FIG. 6 illustrates an exemplary user interface showing an enterprise push application running in the foreground of a mobile device receiving an application-directed type message from the enterprise push server shown in FIG. 1.

FIG. 6 illustrates an exemplary user interface 600 showing the enterprise push application 112 running in the foreground of the mobile device 110 receiving an application-directed type message 610 from the enterprise push application 150. The application-directed type message 610 may need to be delivered to the specific application for which the message is intended. When the enterprise push application 112 is running in the foreground and determines that the message 610 is an application-directed type message, the enterprise push application 112 will put the message 610 in the inbox 410. However, unlike previous messages 414 and 420, the enterprise push application 112 may not be able to parse the content of the application-directed type message 610. The enterprise push application 112 may be able to only display a general message telling the user that the message 610 is for a specific application. In this example, the specification application includes a Sales Force Automation (SFA) application. The user may select the message 610 to launch the SFA application. Once the SFA application is launched, the message 610 is delivered to the SFA application. To this end, the message 610 may stay in the inbox 410 until the SFA application is launched, at which time the message 610 may be delivered to the SFA application. If multiple application-directed type messages are received for the same application, only one message may be shown in the inbox 410. After the user clicks the message 610, the enterprise push application 112 may launch the application and pass along to the SFA application the multiple messages associated therewith.

Figure 7A:
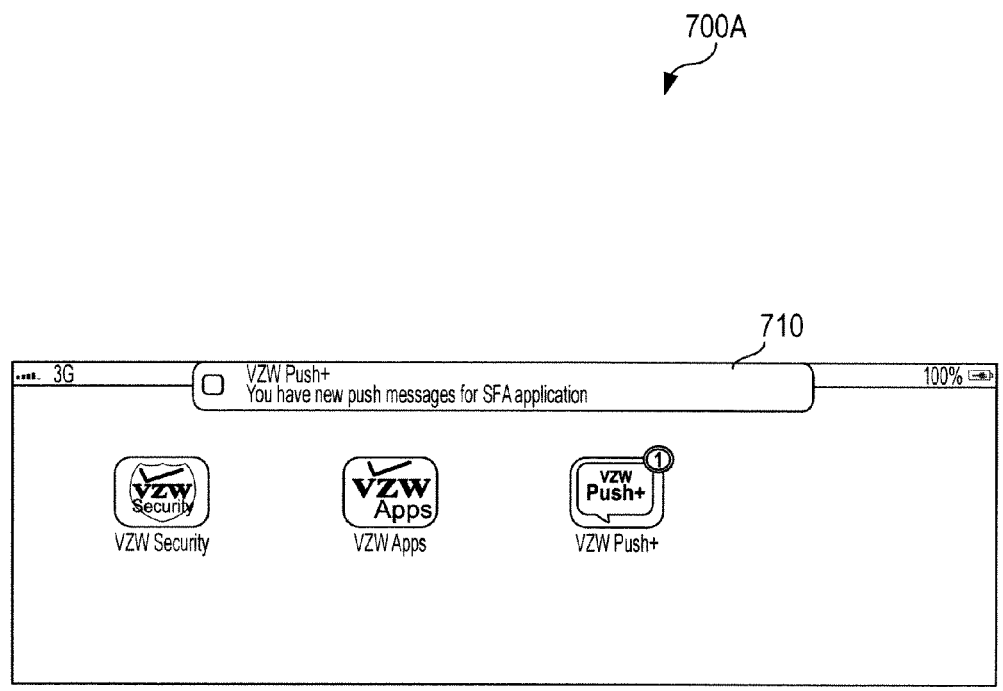
FIGS. 7A-7B illustrates an exemplary user interface showing an enterprise push application running in the background of a mobile device receiving an application-directed type message from the enterprise push server shown in FIG. 1.
Figure 7B:
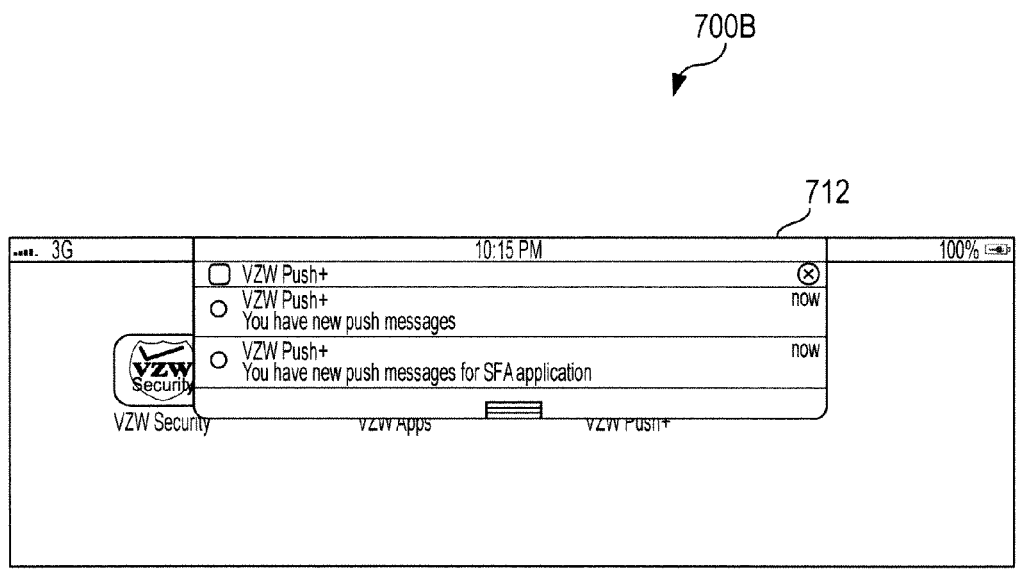

FIG. 7A illustrates an exemplary user interface 700A showing the enterprise push application 112 running in the background of the mobile device 110 receiving an application-directed type message from the enterprise push application 150. Similarly to the enterprise push application message delivery described above with respect to FIG. 5A, when an application-directed type message arrives at the enterprise push application 112, the enterprise push application 112 sends an iOS local notification to notify the user that he/she has a new push message. The notification may be shown in the form of a banner 710 on top of the screen or in some other location of the client device 110. The banner 710 may be similar to the banner 510, except it will inform the user that the message is for a specific application.

The banner 710 may also appear for several seconds and disappear thereafter. If the banner 710 disappears, it can be later viewed in the iOS notification center. In one example, the iOS notification center 712 may be accessed by swiping the top of the screen, as shown by an exemplary user interface 700B of FIG. 7B. If the user selects the banner 710 or the notification 712 in the iOS notification center, the user may launch the enterprise push application 112, which will automatically launch the application and send the message to the application. Alternatively, the enterprise push application 112 may show the message in the inbox 410. Similar to the previous message 610, the enterprise push application 112 may not be able to parse the content of the application-directed type message 710. The enterprise push application 112 may be able to only display a general message telling the user that the message 710 is for a specific application. The user may have to launch the specific application to process the message. If there are multiple application-directed type messages for the same application, only one message may be shown in the notification center.

In one implementation, for application-directed type messages, if the user does not take action in the local notification or in the inbox 410, the messages may stay in the inbox 410. When the user launches the application, the application may launch the enterprise push application 112. The enterprise push application 112 may then immediately launch the application again, along with the pending messages for the application. This transition may happen relatively fast and the user may not notice the second launch of the application by the enterprise push application 112. At this stage, the application receives the notifications from the enterprise push application 112 for processing.

Referring again to FIG. 1, a mobile station 10 communicates over the air with a base station 115 and through the traffic network 130 for various voice and data communications, e.g. through the Internet 134 with a server 180 and/or through network 132 with enterprise application servers 140, 142, the push server 150, the SSO server 160, and the authentication server 170. If the mobile service carrier offers the enterprise push notification service described above, the service may be hosted on a carrier operated push server 150, for communication via the networks 130 and 132. Additionally, another enterprise push notification service may be provided by a separate entity (alone or through agreements with the carrier), in which case, the service may be hosted on the server 180 connected for communication via the networks 130 and 134. To illustrate, the client device 110 may have enterprise applications associated with different enterprises. For example, the client device 110 may have an enterprise application 110a associated with the Verizon Wireless™ and another enterprise application associated with the AT&T™, each of which may offer its own enterprise push notification system. To this end, the user may register the enterprise application 110a with the Verizon Wireless push server (e.g., push server 150) through the Verizon Wireless push application (e.g., push application 112) and may register the other enterprise application with the AT&T push server (e.g., push server 18) through the AT&T push application.

Server such as 160 and 180 may provide any of a variety of common application or service functions in support of or in addition to an application program running on the mobile station 13. However, for purposes of further discussion, we will focus on functions thereof in support of the enterprise push notification service. For a given service, including the enterprise push notification service, an application program within the mobile station may be considered as a 'client' and the programming at 160 or 180 may be considered as the 'server' application for that service.

To insure that the application service offered by server 160 is available only to authorized devices/users, the provider of the application service also deploys an authentication server 170. The authentication server 170 could be a separate physical server as shown, or the authentication server 170 could be implemented as another program module running on the same hardware platform as the server application 160. Essentially, when the server application (server 160 in our example) receives a service request from a client application on a mobile station 110, the server application provides appropriate information to the authentication server 170 to allow server application 170 to authenticate the mobile station 110. Upon successful authentication, the server 170 informs the server application 160, which provides a token to the enterprise push application 112 on the mobile station 110. The token is also provided to the enterprise push server 150 along with the application ID for which enterprise push notification service is being requested. The enterprise push application 112 provides the token along with the application ID to the push server 150 for registering the application with the enterprise push notification server. The push server 150 determines if the application ID and the token match the ones provided by the server 160, and if so, it registers the application to receive push notification. If the tokens do not match, the server 160 returns a failure notification to the enterprise application 112. A similar authentication function may be provided for enterprise push notification service(s) offered via the server 180, either by the server 170 if there is an appropriate arrangement between the carrier and the operator of server 180, or by a program on the server 180, or via a separate authentication server (not shown) connected to the Internet 23.

The enterprise push notification service under consideration here may be delivered to touchscreen type mobile stations as well as to non-touch type mobile stations. Hence, our simple example shows the mobile station 110 as a touchscreen type mobile station. Implementation of the enterprise push notification service will involve at least some execution of programming in the mobile stations, as well as implementation of user input/output functions and data communications through the network 140 from the mobile stations. It may be useful to consider the functional elements/aspects of two exemplary mobile stations 110, 120 at a high level.

Figure 8:
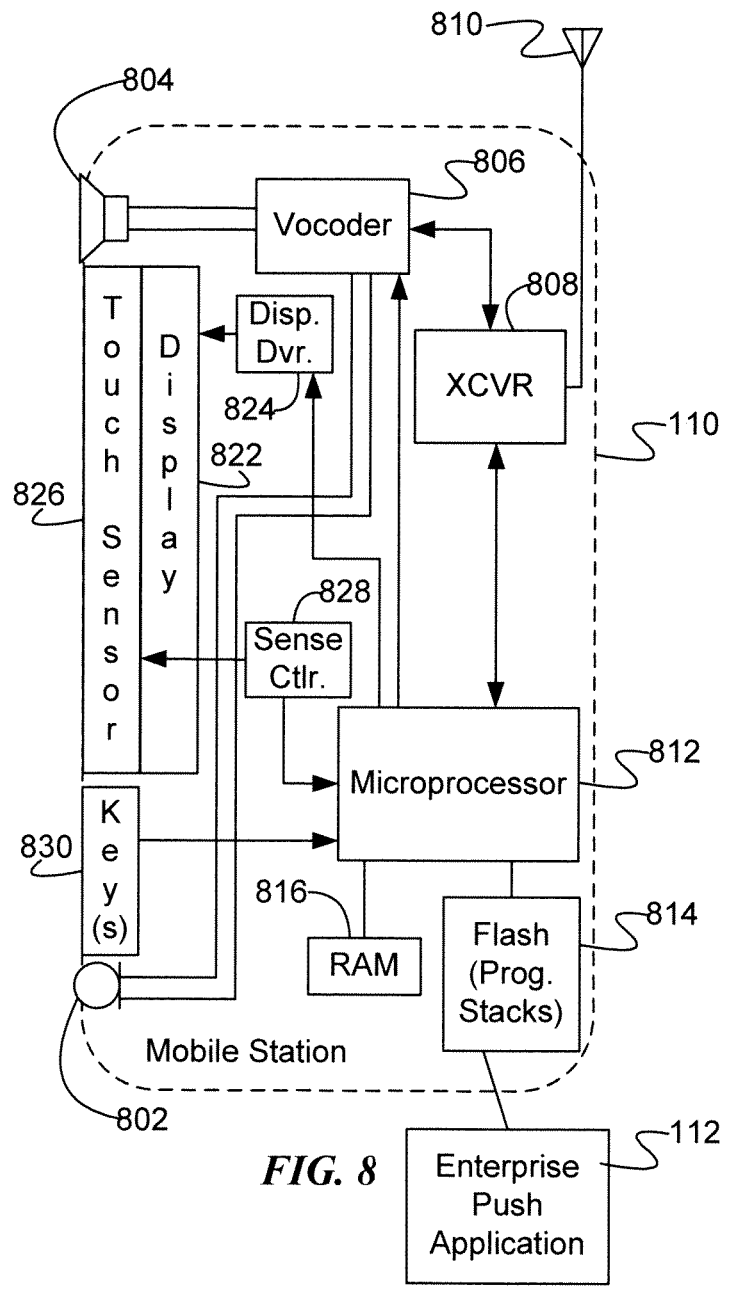
FIG. 8 is a block diagram illustration of the mobile device shown in FIG. 1.

For purposes of such a discussion, FIG. 8 provides a block diagram illustration of an exemplary touch type mobile station 110. Although the mobile station 110 may be a smartphone or may be incorporated into another device, such as a personal digital assistant (PDA) or the like, for discussion purposes the illustration shows the mobile station 110 in the form of a handset. The handset embodiment of the mobile station 110 functions as a normal digital wireless telephone station. For that function, the station 110 includes a microphone 802 for audio signal input and a speaker 804 for audio signal output. The microphone 802 and speaker 804 connect to voice coding and decoding circuitry (vocoder) 806. For a voice telephone call, for example, the vocoder 806 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 110 also includes at least one digital transceiver (XCVR) 808. Today, the handset 110 would be configured for digital wireless communications using one or more of the common network technology types. The concepts discussed here encompass embodiments of the mobile station 110 utilizing any digital transceivers that conform to current or future developed digital wireless communication standards. The mobile station 110 may also be capable of analog operation via a legacy network technology.

The transceiver 808 provides two-way wireless communication of information, such as vocoded speech samples and/or digital information, in accordance with the technology of the network 130. The transceiver 808 also sends and receives a variety of signaling messages in support of the various voice and data services provided via the mobile station 10 and the communication network. Each transceiver 808 connects through RF send and receive amplifiers (not separately shown) to an antenna 810. The transceiver may also support various types of mobile messaging services, such as short message service (SMS), enhanced messaging service (EMS) and/or multimedia messaging service (MMS).

The mobile station 110 includes a touchscreen display 826 for displaying messages, menus or the like, call-related information dialed by the user, calling-party numbers, etc., including enterprise notifications received via the enterprise push application 112 from the enterprise server 150. The display 826 is a device that displays information to a user and can detect occurrence and location of a touch of an area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. Hence, the exemplary mobile station 110 includes a display 822, which the microprocessor 812 controls via a display driver 824, to present visible outputs to the device user. The mobile station 110 also includes a touch/position sensor 826. The sensor 826 is relatively transparent, so that the user may view the information presented on the display 822. A sense circuit 828 senses signals from elements of the touch/position sensor 826 and detects occurrence and position of each touch of the screen formed by the display 822 and sensor 826. The sense circuit 828 provides touch position information to the microprocessor 812, which can correlate that information to the information currently displayed via the display 822 to determine the nature of user input via the screen.

The display 822 and touch sensor 826 (and possibly one or more keys 830, if included) are the physical elements providing the textual and graphical user interface for the mobile station 110. The microphone 802 and speaker 804 may be used as additional user interface elements, for audio input and output.

In addition to normal telephone and data communication related input/output (including message input and message display functions), the user interface elements also may be used for display of menus and other information to the user and for user input of selections, including any input needed during selection of the specific notification message in the inbox 410 of the enterprise push application 112. The microprocessor 812 serves as a programmable controller for the mobile station 110, in that it controls all operations of the mobile station 110 in accordance with programming that it executes, for all normal operations, and for operations involved in the enterprise push notification procedure under consideration here. In the example, the mobile station 110 includes flash type program memory 814, for storage of various "software" or "firmware" program routines and mobile configuration settings, such as mobile directory number (MDN) and/or mobile identification number (MIN), etc. The mobile station 110 may also include a non-volatile random access memory (RAM) 816 for a working data processing memory. Of course, other storage devices or configurations may be added to or substituted for those in the example. In a present implementation, the flash type program memory 814 stores firmware such as a boot routine, device driver software, an operating system, call processing software and vocoder control software, and any of a wide variety of other applications, such as client browser software and short message service software. The memories 814, 816 also store various data, such as telephone numbers and server addresses, downloaded data such as multimedia content, and various data input by the user. Programming stored in the flash type program memory 814, sometimes referred to as "firmware," is loaded into and executed by the microprocessor 812.

As outlined above, the mobile station 110 includes a processor, and programming stored in the flash memory 814 configures the processor so that the mobile station is capable of performing various desired functions, including in this case the functions involved in the technique for providing enterprise push notification.

The applications that are not associated with the specific enterprise may not be able to receive enterprise notifications through the enterprise push notification application 112. To this end, they may register via the APNS server of the Apple Inc. to receive enterprise notifications. For example, a non Verizon application may go through the APNS registration to register with the APNS server of the Apple Inc. and may receive notification through the APNS server. After successful registration, a data connection is established between the iOS of the client device 110 and the APNS server. The APNS server sends to the iOS of the client device, the enterprise notification for the non-Verizon application. Since the data connection is between the iOS of the client device 110 and the APNS server, the notification is displayed by the iOS Local Notification feature. In one implementation, the applications not associated with the specific enterprise application 110a (e.g., non Verizon applications) may be programmed to automatically register with the APNS server through the iOS logic of the client device 110 and the applications associated with the specific enterprise application 110a (e.g., Verizon applications) may be programmed to automatically register with the push server 150 through the enterprise push application 110a.

In one implementation, the enterprise application 110a may be able to set up a data connection with the enterprise push server 150 through the enterprise push application 110a and also set up a data connection with the APNS server through the iOS logic of the client device 110. To this end, the enterprise application may receive notifications through both the APNS server and the enterprise push server 150.

In one general aspect, the instant application describes a method that includes steps of: receiving, at an enterprise push application on a mobile device, a registration credential for registering an enterprise application with an enterprise push server operated by a first enterprise; forwarding the registration credential from the enterprise push application to the enterprise push server for registering the enterprise application with the enterprise push server; receiving, at the enterprise push application and from enterprise push server, an indication of successful registration of the enterprise application; and responsive to the indication of a successful registration, establishing a first persistent connection between the enterprise push application and the enterprise push server to receive enterprise data from the enterprise push server and at the enterprise push application, the first persistent connection being in addition to or instead of a second persistent connection established by a second enterprise different from the first enterprise for routing the enterprise data to the mobile device.

The above general aspect may include one or more of the following features. The first persistent connection may be established between a mobile communication network provider and the mobile device; and the second persistent connection may be established between Apple Inc. and the mobile device by APNS. The mobile communication network provider may include Verizon Wireless. The first persistent connection may be in addition to the second persistent connection, and the first and second persistent connections may operate in accordance with a Push Technology. The first persistent connection may be instead of the second persistent connection, and the first and second persistent connections may operate in accordance with a Push Technology. The mobile device may be a device manufactured by Apple Inc.

Establishing the first persistent connection may include establishing the first persistent connection for receiving on the first persistent connection enterprise data with a payload larger than 256 bytes. The method may further include a step of providing an acknowledgment to the enterprise push server upon reception of the enterprise data. The login credential may include an application ID associated with the enterprise application and a token. The method may further include steps of receiving, at the enterprise push application on the mobile device, a request to register a second enterprise application; forwarding an application ID associated with the second enterprise application to a Single Sign On (SSO) application for authentication; receiving from the SSO application a token; forwarding the application ID and the token to the enterprise push server for registering the second enterprise application with the enterprise push server; receiving, at the enterprise push application and from the enterprise push server, an indication of successful registration of the second enterprise application; and receiving, over the first persistent connection and from the enterprise push server, data for delivery to the second enterprise application.

The method may further include steps of receiving, at the enterprise push application and from the enterprise push server, an enterprise message; identifying that the message is for the enterprise application; and responsive to the identification, delivering the message from the enterprise push application to the enterprise application for processing. The method may further include steps of receiving, at the enterprise push application and from the enterprise push server, an enterprise message; identifying that the message is for the enterprise push application; and responsive to the identification, processing the message at the enterprise push application. The enterprise data received on the second persistent connection may be a subset of the enterprise data received on the first persistent connection. The first persistent connection may be established via a first push application installed on the mobile device and associated with the first enterprise, and the second persistent connection may be established via a second push application installed on the mobile device and associated with Apple Inc.

These general and specific aspects may be implemented using a system, a method, a computer program, a computer readable medium, or an apparatus or any combination of systems, methods, computer programs, computer readable mediums, and/or apparatuses.

As shown by the above discussion, functions relating to the enterprise push notification server may be implemented on computers connected for data communication via the components of a packet data network, operating as the client device 110 and as the push server 150 as shown in FIG. 1. Although special purpose devices may be used, such devices also may be implemented using one or more hardware platforms intended to represent a general class of data processing device commonly used to run "server" programming so as to implement the enterprise push notification functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the enterprise push notification service. The software code is executable by the general-purpose computer that functions as the enterprise push server and/or that functions as the client device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enterprise push notification service, in essentially the manner performed in the implementations discussed and illustrated herein.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the enterprise push notification service outlined above may be embodied in programming. Program aspects of the technology may be thought of as "products" or "articles of manufacture," typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the enterprise push notification platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
 receiving, at an enterprise push application on a mobile device, a registration credential for registering an enterprise application with an enterprise push server operated by a first enterprise;

forwarding the registration credential from the enterprise push application to the enterprise push server for registering the enterprise application with the enterprise push server;

receiving, at the enterprise push application and from enterprise push server, an indication of successful registration of the enterprise application; and responsive to the indication of a successful registration, establishing a first persistent connection between the enterprise push application and the enterprise push server to receive enterprise data from the enterprise push server and at the enterprise push application, the first persistent connection being in addition to or instead of a second persistent connection established by a second enterprise different from the first enterprise for routing the enterprise data to the mobile device;

receiving, at the enterprise push application on the mobile device, a request to register a second enterprise application;

forwarding an application ID associated with the second enterprise application to a Single Sign On (SSO) application for authentication;

receiving from the SSO application a token;

forwarding the application ID and the token to the enterprise push server for registering the second enterprise application with the enterprise push server;

receiving, at the enterprise push application and from the enterprise push server, an indication of successful registration of the second enterprise application; and receiving, over the first persistent connection and from the enterprise push server, data for delivery to the second enterprise application.

2. The method of claim 1, wherein:
the first persistent connection is established between a mobile communication network provider and the mobile device; and
the second persistent connection is established between a manufacturer of the mobile device and the mobile device by a push notification service provided by the manufacturer.

3. The method of claim 1, wherein:
the first persistent connection is in addition to the second persistent connection, and
the first and second persistent connections operate in accordance with a Push Technology.

4. The method of claim 1, wherein:
the first persistent connection is instead of the second persistent connection, and
the first and second persistent connections operate in accordance with a Push Technology.

5. The method of claim 1, wherein establishing the first persistent connection includes establishing the first persistent connection for receiving on the first persistent connection enterprise data with a payload larger than 256 bytes.

6. The method of claim 1, further comprising providing an acknowledgment to the enterprise push server upon reception of the enterprise data.

7. The method of claim 1, further comprising:
receiving, at the enterprise push application and from the enterprise push server, an enterprise message;
identifying that the message is for the enterprise application; and
responsive to the identification, delivering the message from the enterprise push application to the enterprise application for processing.

8. The method of claim 1, further comprising:
receiving, at the enterprise push application and from the enterprise push server, an enterprise message;
identifying that the message is for the enterprise push application; and
responsive to the identification, processing the message at the enterprise push application.

9. The method of claim 1, wherein the enterprise data received on the second persistent connection is a subset of the enterprise data received on the first persistent connection.

10. The method of claim 1, wherein:
the first persistent connection is established via a first push application installed on the mobile device and associated with the first enterprise, and
the second persistent connection is established via a second push application installed on the mobile device and associated with a provider of the mobile device.

11. A mobile device comprising:
a processor; and
a memory storing executable instructions for causing the processor to:
receive, at an enterprise push application on a mobile device, a registration credential for registering an enterprise application with an enterprise push server operated by a first enterprise;
forward the registration credential from the enterprise push application to the enterprise push server for registering the enterprise application with the enterprise push server;
receive, at the enterprise push application and from first enterprise push server, an indication of successful registration of the enterprise application; and
responsive to the indication of a successful registration, establish a first persistent connection between the enterprise push application and the enterprise push server to receive enterprise data from the enterprise push server and at the enterprise push application, the first persistent connection being in addition to or instead of a second persistent connection established by a second enterprise different from the first enterprise for routing enterprise data to the mobile device;
receive, at the enterprise push application on the mobile device, a request to register a second enterprise application;
forward an application ID associated with the second enterprise application to a Single Sign On (SSO) application for authentication;
receive from the SSO application a token;
forward the application ID and the token to the enterprise push server for registering the second enterprise application with the enterprise push server;
receive, at the enterprise push application and from the enterprise push server, an indication of successful registration of the second enterprise application; and
receive, over the first persistent connection and from the enterprise push server, data for delivery to the second enterprise application.

12. The mobile device of claim 11, wherein:
the first persistent connection is established between a mobile communication network provider and the mobile device;
the second persistent connection is established between a manufacturer of the mobile device and the mobile device by a push notification service provided by the manufacturer.

13. The mobile device of claim 11, wherein:
the first persistent connection is in addition to the second persistent connection, and
the first and second persistent connections operate in accordance with a Push Technology.

14. The mobile device of claim 11, wherein:
the first persistent connection is instead of the second persistent connection, and
the first and second persistent connections operate in accordance with a Push Technology.

15. The mobile device of claim 11, wherein to establish the first persistent connection the memory further stores executable instructions for causing the processor to establish the first persistent connection configured to receive enterprise data with a payload larger than 256 bytes.

16. The mobile device of claim 11, wherein the memory further stores executable instructions for causing the processor to:
receive, at the enterprise push application and from the enterprise push server, an enterprise message;
identify that the message is for the enterprise application; and
responsive to the identification, deliver the message from the enterprise push application to the enterprise application for processing.

17. The mobile device of claim 16, wherein the memory further stores executable instructions for causing the processor to display the message along with an identity of the enterprise application without further processing at the enterprise push application.

18. The mobile device of claim 11, wherein the memory further stores executable instructions for causing the processor to:
receive, at the enterprise push application and from the enterprise push server, an enterprise message;
identify that the message is for the enterprise push application; and
responsive to the identification, process the message at the enterprise push application.

19. The mobile device of claim 18, wherein the memory further stores executable instructions for causing the processor to display a content of the message.

20. The mobile device of claim 11, wherein the enterprise data received on the second persistent connection is a subset of the enterprise data received on the first persistent connection.

21. The mobile device of claim 11, wherein:
the first persistent connection is established via a first push application installed on the mobile device and associated with the first enterprise, and
the second persistent connection is established via a second push application installed on the mobile device and associated with a provider of the mobile device.

* * * * *